US006549315B1

United States Patent
Kakui

(10) Patent No.: US 6,549,315 B1
(45) Date of Patent: Apr. 15, 2003

(54) OPTICAL TRANSMISSION SYSTEM AND OPTICAL AMPLIFYING APPARATUS, OPTICAL AMPLIFYING UNIT, AND OPTICAL COUPLER FOR THE SAME

(75) Inventor: Motoki Kakui, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/400,188

(22) Filed: Sep. 21, 1999

(30) Foreign Application Priority Data

Jul. 30, 1999 (JP) .......................... 11-217332

(51) Int. Cl.[7] .............................. H04J 14/02
(52) U.S. Cl. .................. 359/134; 359/127; 359/341.2; 359/341.33
(58) Field of Search ................ 359/134, 127, 359/161, 177, 341.2, 341.33, 349

(56) References Cited

U.S. PATENT DOCUMENTS

| | | | | |
|---|---|---|---|---|
| 5,392,154 A | | 2/1995 | Chang et al. ............. | 359/341 |
| 5,406,404 A | * | 4/1995 | DiGiovanni et al. ....... | 359/161 |
| 5,654,816 A | * | 8/1997 | Fishman .................. | 359/177 |
| 5,790,721 A | | 8/1998 | Lee ....................... | 385/11 |
| 5,801,878 A | * | 9/1998 | Bourret et al. .......... | 359/341 |
| 5,940,209 A | * | 8/1999 | Nguyen .................. | 359/341 |
| 6,104,526 A | * | 8/2000 | Kakui .................... | 359/337 |
| 6,246,515 B1 | * | 6/2001 | Cereo et al. ............. | 359/345 |
| 6,381,063 B1 | * | 4/2002 | Liu ....................... | 359/337 |

FOREIGN PATENT DOCUMENTS

EP    0556973 A1    8/1993

OTHER PUBLICATIONS

European Search Report dated Nov. 7, 2000.
"Erbium–doped fibre pre–amplifier with an integral bank-–pass filter", D. Simeonidou et al., The Institute of Electrical Engineers, 1993, pp. 13/1–13/4.
"1 Terabit/s WDM Transmission over 10,000 km", T. Naito et al., Oct. 29, 1999, pp. 24–25.
1.1–Tb/s (55×20–Gb/s) Dense WDM Soliton Transmission Over 3,020–km Widely–Dispersion–Managed Transmission Line Employing 1.55/1.58–μm Hybrid Repeaters, K. Fukuchi et al., Oct. 29, 1999, pp. 42–43.
"765 Gb/s over 2,000 km Transmission Using C– and L–Band Erbium Doped Fiber Amplifiers", M. Ma et al., OFC'99, Postdeadline papers, PD16 (1999), pp. 1–3.

* cited by examiner

*Primary Examiner*—John Tweel
(74) *Attorney, Agent, or Firm*—McDermott, Will & Emery

(57) ABSTRACT

Inputted multiplexed optical signal is separated by an optical branching section into C-band multiplexed optical signal and L-band multiplexed optical signal, and the C-band multiplexed optical signal and L-band multiplexed optical signal are optically amplified by a C-band optical amplifier and an L-band optical amplifier, respectively. The amplified optical signals are combined by an optical combiner, and thus combined optical signal is outputted therefrom. The backward ASE light generated in the L-band optical amplifier upon optical amplification is blocked by an optical filter disposed between the optical amplifier and the optical branching section, so as to be prevented from traveling backward and being inputted to and amplified by the C-band optical amplifier, whereby the deterioration of noise characteristics is restrained.

13 Claims, 5 Drawing Sheets

OPTICAL TRANSMISSION SYSTEM AND OPTICAL AMPLIFYING APPARATUS, OPTICAL AMPLIFYING UNIT, AND OPTICAL COUPLER FOR THE SAME

BACKGROUND OF THE INVENTION

1. Field of the Invention

The present invention relates to an optical transmission system for amplifying and relaying a plurality of optical wavelength signals in a wide band; and an optical amplifying apparatus, an optical amplifying unit, and an optical coupler which are suitably used in this optical transmission system.

2. Related Background Art

Wavelength division multiplexing (WDM) transmission systems, which transmit a plurality of optical wavelength signals, have been known as a system which can carry out high-speed, large-capacity optical communications. Since the transmission loss of optical silica-based fibers used as optical transmission lines is low in the vicinity of a wavelength of 1.55 $\mu$m, and C-band optical amplifiers for amplifying optical signals in C band (1.55-$\mu$m wavelength band, 1530 nm to 1562 nm in general) have been in practical use, such a WDM transmission system uses a plurality of optical wavelength signals in C band.

Recently, however, since further higher speed and larger capacity have been demanded, while L-band optical amplifiers for amplifying optical signals in L band (1.58-$\mu$m wavelength band, 1574 nm to 1605 nm in general) have been under development, the use of L-band optical signals in addition to C-band optical signals for carrying out WDM transmissions has been under consideration. Examples of literatures disclosing the same include M. X. Ma et al., "765 Gb/s over 2,000 km Transmission Using C- and L-band Erbium Doped Fiber Amplifiers," OFC'99, Postdeadline papers, PD16 (1999), and the like.

It is necessary for optical amplifying apparatus in such an optical transmission system to optically amplify optical signals in a band including both of C band and L band. Therefore, it is a common practice to provide dedicated optical amplifiers for C band and L band, respectively. Namely, the optical amplifying apparatus if configured such that an inputted multiplexed optical signal is separated by an optical branching section into a C band multiplexed optical signal and an L band multiplexed optical signal, the C band multiplexed optical signal is optically amplified by the C-band optical amplifier, the L band multiplexed optical signal is optically amplified by the L-band optical amplifier, thus optically amplified multiplexed optical signals are combined by an optical combiner, and the resulting combined optical signal is outputted.

SUMMARY OF THE INVENTION

As the above-mentioned C-band optical amplifier and L-band optical amplifier, Er-doped fiber amplifiers (EDFA) are in wide use. The inventor has found that, when such an EDFA is used for constructing the above-mentioned WDM transmission system, there are problems as follows.

Namely, backward ASE (Amplified Spontaneous Emission) light has a peak not in L band but in C band, and the interband isolation in the optical branching section is not perfect. Therefore, due to Rayleigh scattering in the optical fiber line connected to the upstream stage of the optical branching section, the backward ASE light generated in the L-band optical amplifier is inputted to the C-band optical amplifier as return light by way of the optical branching section, so as to become noise. Therefore, for securing a favorable optical SN ratio, it is inevitable to reduce the number of stages of amplification and relay, which forms a bottleneck in long-distance transmissions.

For overcoming the above-mentioned problems according to the above-mentioned finding of the inventor, it is an object of the present invention to provide an optical transmission system, suitable for long-distance transmissions, which can increase the number of stages of amplification and relay while securing a favorable optical SN ratio; and an optical amplifying apparatus, an optical amplifying unit, and an optical coupler used in this optical transmission system.

Namely, the optical transmission system in accordance with the present invention is an optical transmission system for transmitting a multiplexed optical signal belonging to two wavelength bands to first and second transmission lines which are connected to each other by way of an amplifying repeater station, the amplifying repeater station comprising: (1) an optical branching section, connected to the first transmission line, for separating the multiplexed optical signal into first and second wavelength bands different from each other and outputting thus separated multiplexed optical signals individually, while transmitting therethrough return light from a branch thereof to the first transmission line; (2) two optical amplifiers, each having an amplification optical waveguide doped with a predetermined fluorescent material having a fluorescent spectrum peak in the first wavelength band, connected to two outputs of the optical branching section, respectively, for amplifying the each of the multiplexed optical signals; (3) an optical combiner, connected to respective outputs of the optical amplifiers, for combining the amplified multiplexed optical signals and outputting thus combined optical signal to the second transmission line; and (4) an optical filter, connected between the optical amplifier for amplifying the multiplexed optical signal in the second wavelength band and the optical branching section, for blocking light in the vicinity of the fluorescent spectrum peak wavelength and transmitting therethrough light in the second wavelength band.

The optical amplifying apparatus in accordance with the present invention is suitably used in such an optical transmission system, and comprises: (1) an optical branching section for separating the multiplexed optical signal into first and second wavelength bands different from each other and outputting thus separated multiplexed optical signals individually; (2) two optical amplifiers, each having an amplification optical waveguide doped with a predetermined fluorescent material having a fluorescent spectrum peak in the first wavelength band, connected to two outputs of the optical branching section, respectively, for amplifying the each of the separated multiplexed optical signals; (3) an optical combiner, connected to respective outputs of the optical amplifiers, for combining the amplified multiplexed optical signals and outputting thus combined optical signal; and (4) an optical filter, connected between the optical amplifier for amplifying the multiplexed optical signal in the second wavelength band and the optical branching section, for blocking light in the vicinity of the fluorescent spectrum peak wavelength and transmitting therethrough light in the second wavelength band.

The optical amplifying unit in accordance with the present invention is an optical amplifying unit suitably used in the above-mentioned optical transmission system, and comprises: (1) an optical amplifier, having an amplification optical waveguide doped with a predetermined fluorescent material, for amplifying a multiplexed optical signal in a wavelength band different from a wavelength band including a fluorescent spectrum peak of the fluorescent material; and (2) an optical filter, connected to an input end of the optical amplifier, for blocking light in the vicinity of the fluorescent spectrum peak wavelength of the fluorescent material and transmitting therethrough light in the wavelength band to be amplified by the optical amplifier.

The optical coupler in accordance with the present invention is an optical coupler suitably used in the above-mentioned optical transmission system, and comprises: (1) an optical branching section for separating the multiplexed optical signal into first and second wavelength bands different from each other and outputting thus separated multiplexed optical signals individually; and (2) an optical filter, connected to an output end of the optical branching section for the multiplexed optical signal in the second wavelength band, for guiding the optical signal to an optical amplifier having an optical amplification waveguide doped with a fluorescent material having a fluorescent spectrum peak in the first wavelength band, the optical filter blocking light in the vicinity of the fluorescent spectrum peak wavelength and transmitting therethrough light in the second wavelength band.

In the optical transmission system and optical amplifying apparatus in accordance with the present invention, a multiplexed optical signal inputted to the amplifying repeater station or optical amplifying apparatus is separated by the optical branching section into two bands in terms of wavelength bands, and the optical signals thus separated are outputted individually. The multiplexed optical signals in their respective wavelength bands are amplified by their corresponding different optical amplifiers, and then are combined by the optical combiner so as to be outputted.

Here, though the same fluorescent material is added to the respective optical waveguides of the two optical amplifiers, the population inversion of one optical waveguide is made different from that of the other optical waveguide, so that their respective gain bands shift from each other, whereby the wavelength bands to be amplified are changed. In this case, backward ASE light in a band in the vicinity of the fluorescent spectrum peak wavelength can occur in any of the optical amplifiers. In accordance with the present invention, however, since the backward ASE light generated upon optical amplification of the second wavelength band is blocked by the optical filter, the backward ASE light is prevented from being inputted to the optical amplifier for the first wavelength band, which is a band including this backward ASE light, even when the interband isolation is imperfect in the optical branching section. Therefore, the deterioration of noise characteristics is restrained in the optical amplifier for the first wavelength band.

As a result, the optically amplifiable optical signal wavelength band widens in each optical amplifying apparatus, and the noise characteristic of each optical amplifying apparatus becomes better. Therefore, even when the number of stages of amplification and relay is greater than that in conventional cases, a favorable optical SN ratio can be secured, and large-capacity, long-distance communications can be carried out.

Preferably, the optical branching section, the optical filter, and the optical amplifier for the second wavelength band are connected in series in this order. It is due to the fact that, if an optical isolator, for example, is inserted between the optical amplifier for the second wavelength band and the optical branching section, then the SN ratio after the amplification will deteriorate due to the resulting insertion loss, whereby the number of stages of amplification will be limited.

Preferably, the optical filter is an optical fiber grating in which a grating is formed in a core region of an optical fiber. In this case, the insertion loss with respect to the light in the second wavelength band to be transmitted through the optical filter is small, and fusion loss is small when the optical filter is connected to an optical fiber by fusion. Further, it will be preferable if the optical fiber formed with the optical fiber grating and optical fibers connected to both ends thereof are of the same kind, since the fusion loss becomes substantially zero as a consequence.

Preferably, the fluorescent material added to each of the amplification optical waveguides is Er element or Tm element. It is due to the fact that efficient optical amplification is carried out in a wavelength band where the transmission loss of a optical silica-based fiber used as the optical transmission line is small.

The present invention will become more fully understood from the detailed description given hereinbelow and the accompanying drawings. They are given by way of illustration only, and thus should not be considered limitative of the present invention.

Further scope of applicability of the present invention will become apparent from the detailed description given hereinafter. However, it is clear that the detailed description and specific examples, while indicating preferred embodiments of the invention, are given by way of illustration only, and various changes and modifications within the spirit and scope of the invention will become apparent to those skilled in the art from this detailed description.

DESCRIPTION OF THE PREFERRED EMBODIMENTS

Figure 1:
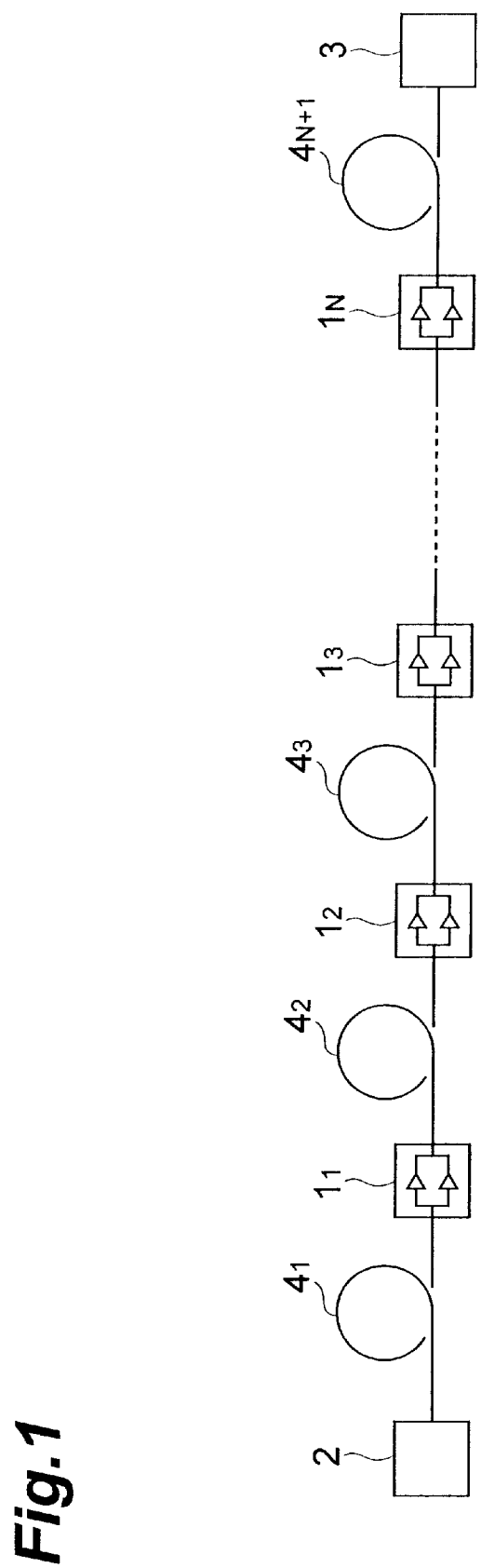
FIG. 1 is schematic configurational view showing a preferred embodiment of the optical transmission system in accordance with the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted.

FIG. 1 is a schematic configurational view showing a preferred embodiment of the optical transmission system in accordance with the present invention. In this optical transmission system, N stages of optical amplifying repeater stations $1_1$ to $1_N$ are successively disposed between a transmitting station 2 and a receiving station 3, the transmitting station 2 and the repeater station $1_1$ are connected to each other by an optical fiber line $4_1$ the repeater station $1_{n-1}$ and the repeater station $1_n$ are connected to each other by an optical fiber line $4_n$ (n=2 to N), and the repeater station $1_N$ and the receiving station 3 are connected to each other by an optical fiber line $4_{N+1}$. In this optical transmission system, a multiplexed optical signal belonging to a wavelength band extending over both of C band and L band is sent out from the transmitting station 2, and is relayed and transmitted to the receiving station 3 while being successively amplified by the repeater stations $1_1$ to $1_N$.

Figure 2:
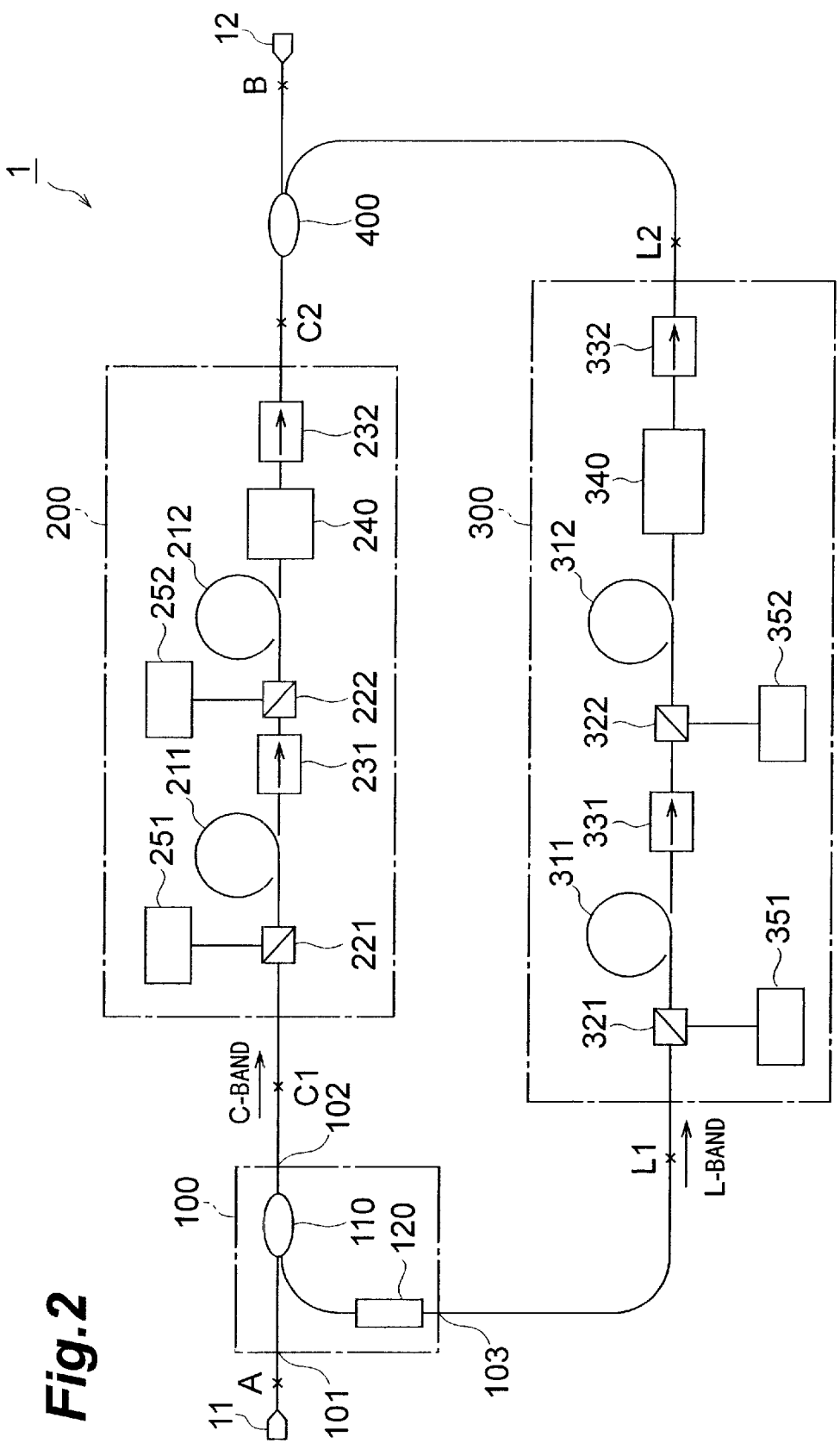
FIG. 2 is a configurational view of an optical amplifying repeater station in the system of FIG. 1.

FIG. 2 is a view showing the main configuration of the repeater station 1. The part shown in this drawing corresponds to the optical amplifying apparatus in accordance with the present invention. Hence, it will be referred to as the optical amplifying apparatus 1 hereinbelow. The optical amplifying apparatus 1 comprises an optical coupler 100, a C-band optical amplifier 200, an L-band optical amplifier 300, and an optical combiner 400; collectively optically amplifies the multiplexed optical signal composed of both C band and L band multiplexed optical signals inputted to the input end 11; aid outputs thus amplified optical signal via the output end 12.

The optical coupler 100 has an input port 101 and two output ports 102 and 103, and is constituted by an optical branching section 110 and an optical filter 120. The optical branching section 110 separates the multiplexed optical signal in a wavelength band including both of C band (1.55-μm wavelength band, 1530 nm to 1562 nm in general) and L band (1.58-μm wavelength band, 1574 nm to 1605 nm in general) inputted from the input port 101 into C-band multiplexed optical signal to the first output port 102 and L-band multiplexed optical signal, and outputs the C-band multiplexed optical signal to the first output port 102 and outputs the L-band multiplexed optical signal to the second output port 103, respectively. Preferably, the optical branching section 110 is formed by use of a grating or interference filter which reflects one of the C-band multiplexed optical signal and L-band multiplexed optical signal and transmits the other therethrough. It will be particularly preferable if an interference filter made of a dielectric multilayer film is used, since it will not change the phase of multiplexed optical signal in the band reflected by the optical branching section 110, whereby the transmission speed of optical signal in this band can be enhanced.

The optical filter 120 is disposed on the L-band optical path between the optical branching section 110 and the second output port 103, transmits therethrough the L-band multiplexed optical signal, and blocks the C-band light. Preferably, a chirped fiber grating in which a core of an optical fiber is formed with a chirped grating (a refractive index modulation with intervals varying in the longitudinal direction of the optical fiber) is used for the optical filter 120. It is due to the fact that the insertion loss is reduced thereby with respect to the L-band multiplexed optical signal to be transmitted therethrough. Further, it is preferred that the grating be formed with an inclination with respect to the optical axis of the optical fiber. It is due to the fact that the C-band light to be blocked would not be reflected to the original optical path in this case.

The C-band optical amplifier 200 optically amplifies the C-band multiplexed optical signal outputted from the first output port 102 of the optical coupler 100 and outputs thus amplified optical signal. The L-band optical amplifier 300 optically amplifies the L-band multiplexed optical signal outputted from the second, output port 103 of the optical coupler 100 and outputs thus amplified optical signal. The optical combiner 400 inputs therein the C-band multiplexed optical signal outputted from the C-band optical amplifier 200 after being optically amplified thereby and the L-band multiplexed optical signal outputted from the L-band optical amplifier 300 after being optically amplified thereby, combines them, and outputs thus combined optical signal to the output end 12.

The C-band optical amplifier 200 comprises a WDM coupler 221, an amplification optical waveguide 211, an optical isolator 231, a WDM coupler 222, an amplification optical waveguide 212, a gain equalizer 240, and an optical isolator 232 which are successively connected from the input side to the output side. The C-band optical amplifier 200 further comprises an excitation light source 251 connected to the WDM coupler 221, and an excitation light source 252 connected to the WDM coupler 222. For reducing the deterioration of noise characteristics, the C-band optical amplifier 200 has a two-stage configuration comprising the two amplification optical waveguides 211 and 212, with no optical isolator (having an insertion loss of about 0.5 dB in general) being disposed in front of the amplification optical waveguide 211 in the front stage$_1.$ Each of the amplification optical waveguides 211 and 212 is an optical fiber, doped with Er element as a fluorescent material, for optically amplifying optical signal, i.e., EDFA. The WDM coupler 221 forwardly transmits the C-band multiplexed optical signal therethrough, and introduces into the amplification optical waveguide 211 the excitation light outputted from the excitation light source 251. Similarly, the WDM coupler 222 forwardly transmits the C-band multiplexed optical signal therethrough, and introduces into the amplification optical waveguide 212 the excitation light outputted from the excitation light source 252. Each of the optical isolators 231 and 232 transmits light forwardly therethrough, but not backwardly. The gain equalizer 240 has a loss spectrum having substantially the same form as that of the gain spectrum of the amplification optical waveguides 211 and 212 in C band, thereby keeping the total gain of the C-band optical amplifier 200 equalized.

The L-band optical amplifier 300 comprises a WDM coupler 321, an amplification optical waveguide 311, an optical isolator 331, a WDM coupler 322, an amplification optical waveguide 312, a gain equalizer 3410, and an optical isolator 332 which are successively connected from the input side to the output side. The L-band optical amplifier 300 further comprises an excitation light source 351 connected to the WDM coupler 321, and an excitation light source 352 connected to the WDM coupler 322. For reducing the deterioration of noise characteristics, the L-band optical amplifier 300 also has a two-stage configuration comprising the two amplification optical waveguides 311 and 312, with no optical isolator being disposed in front of the amplification optical waveguide 311 in the front stage.

Each of the amplification optical waveguides 311 and 312 is an optical fiber, doped with Er element as a fluorescent material, for optically amplifying optical signal, i.e., EDFA. The WDM coupler 321 forwardly transmits the L-band multiplexed optical signal therethrough, and introduces into the amplification optical waveguide 311 the excitation light outputted from the excitation light source 351. Similarly, the WDM coupler 322 forwardly transmits the L-band multiplexed optical signal therethrough, and introduces into the amplification optical waveguide 312 the excitation light outputted from the excitation light source 352. Each of the optical isolators 331 and 332 transmits light forwardly therethrough, but not backwardly. The gain equalizer 340 has a loss spectrum having substantially the same form as that of the gain spectrum of the amplification optical waveguides 311 and 312 in L band, thereby keeping the total gain of the L-band optical amplifier 300 equalized.

The optical amplifying apparatus 1 operates as follows. In the C-band optical amplifier 200, the excitation light outputted from the excitation light source 251 is supplied to the amplification optical waveguide 211 by way of the WDM coupler 221, whereas the excitation light outputted from the excitation light source 252 is supplied to the amplification optical waveguide 212 by way of the WDM coupler 222. In the L-band optical amplifier 300, the excitation light outputted from the excitation light source 351 is supplied to the amplification optical waveguide 311 by way of the WDM coupler 321, whereas the excitation light outputted from the excitation light source 352 is supplied to the amplification optical waveguide 312 by way of the WDM coupler 322.

When the multiplexed optical signal is inputted to the input end 11 of the optical amplifying apparatus 1, this multiplexed optical signal is then fed to the input port of the optical coupler 100, and is separated by the optical branching section 110 into C band and L band. Then, the C-band multiplexed optical signal is outputted from the first output port 102, whereas the L-band multiplexed optical signal is outputted from the second output port 103 after passing through the optical filter 120.

The C-band multiplexed optical signal outputted from the first output port 102 of the optical coupler 100 successively travels through the WDM coupler 221, amplification optical waveguide 211, optical isolator 231, WDM coupler 222, amplification optical waveguide 212, gain equalizer 240, and optical isolator 232 in the C-band optical amplifier 200 and then is outputted from the latter. During this period, the C-band multiplexed optical signal is optically amplified by the amplification optical waveguides 211 and 212, and its gain is equalized by the gain equalizer 240.

The L-band multiplexed optical signal outputted from the second output port 103 of the optical coupler 100 successively travels through the WDM coupler 321, amplification optical waveguide 311, optical isolator 331, WDM coupler 322, amplification optical waveguide 312, gain equalizer 340, and optical isolator 332 in the L-band optical amplifier 300 and then is outputted from the latter. During this period, the L-band optical signal is optically amplified by the amplification optical waveguides 311 and 312, and its gain is equalized by the gain equalizer 340.

The C-band multiplexed optical signal outputted from the C-band optical amplifier 200 and the L-band multiplexed optical signal outputted from the L-band optical amplifier 300 are combined by the optical combiner 400. Then, thus combined optical signal is outputted from the output end 12 of the optical amplifying apparatus 1.

Since each of the L-band amplification optical waveguides 311 and 312 is an EDFA as mentioned above, backward ASE light in a band in the proximity of the fluorescent spectrum peak wavelength of Er occurs upon optical amplification of optical signals. Namely, this backward ASE light is light within C band. If the optical filter 120 is not provided, the backward ASE light thus generated in the L-band optical amplifier 300 will travel backward through the optical path due to the imperfect interband isolation in the optical branching section 110, and then will be reversed so as to be inputted to the C-band optical amplifier 200, in which it will be amplified together with an optical signal, whereby the noise characteristics of the C-band optical amplifier 200 will deteriorate. Since the optical filter 120 is provided in this embodiment, however, the backward ASE light generated in the L-band optical amplifier 300 is blocked by the optical filter 120. As a consequence, the backward ASE light is prevented from entering the C-band optical amplifier 200, and the deterioration of noise characteristics in the C-band optical amplifier 200 is restrained.

Figure 3:
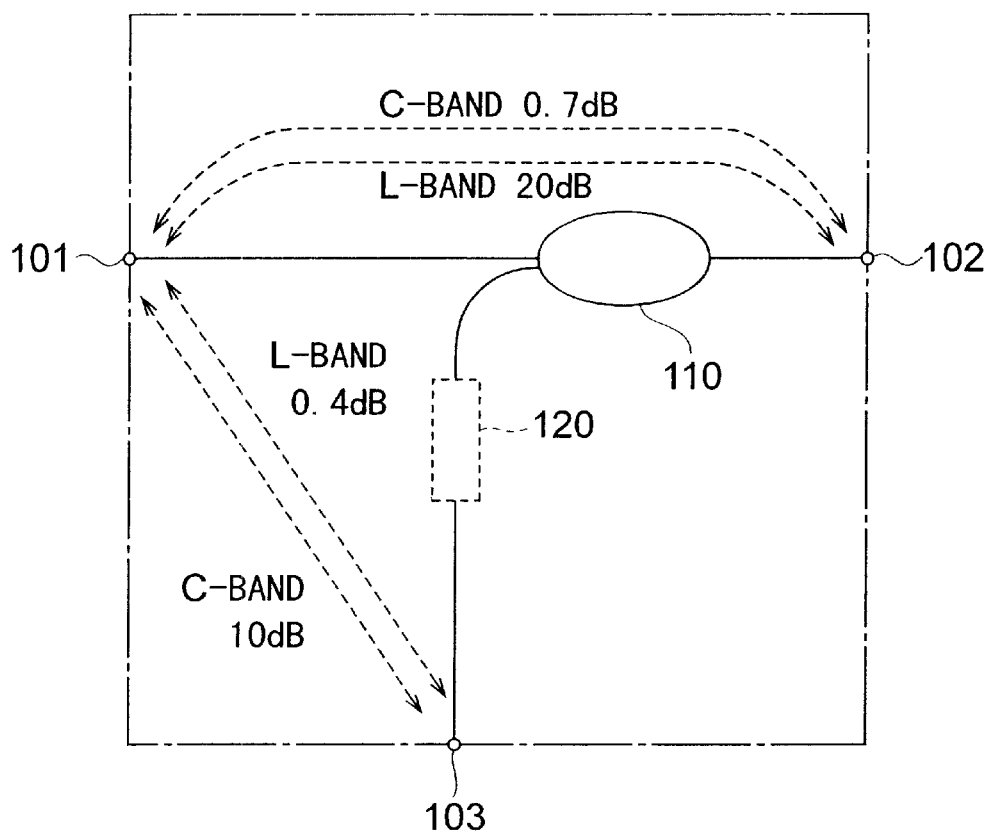
FIG. 3 is a view for explaining characteristics of an optical combiner in the optical amplifying repeater station of FIG. 2.
Figure 4:
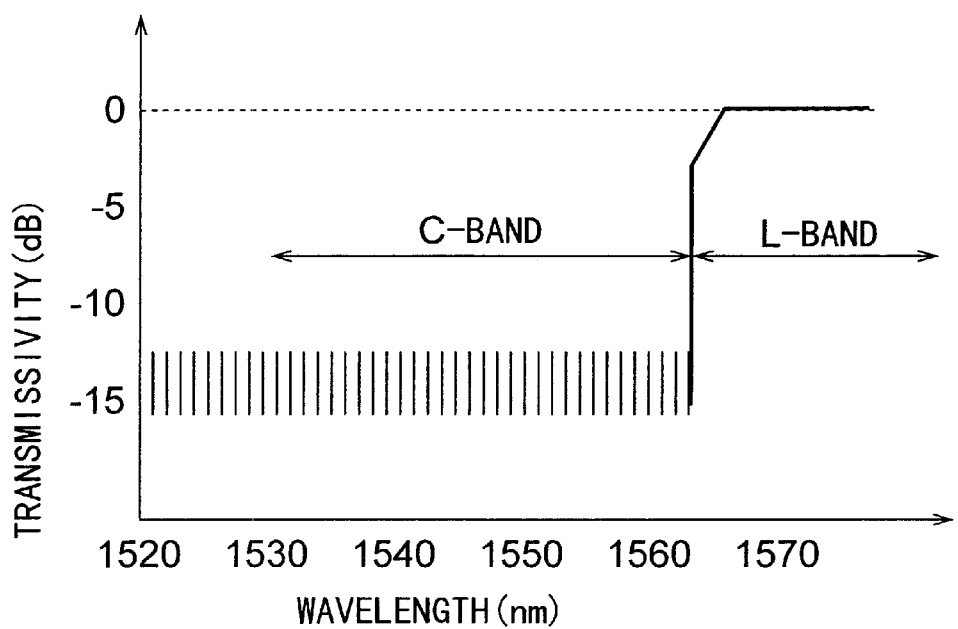
FIG. 4 is a chart schematically showing a transmission spectrum of an optical filter in the optical amplifying repeater station of FIG. 2.

A more specific example of the optical amplifying apparatus 1 will now be explained. In the optical coupler 100, the optical branching section 110 was an interference filter, whereas the optical filter 120 was a chirped fiber grating. As shown in FIG. 3, the insertion loss of the optical branching section 110 (i.e., the insertion loss of the optical coupler 100 in the case without the optical filter 120) was 0.7 dB for C band and 20 dB for L band between the input port 101 and the first output port 102, and 10 dB for C band and 0.4 dB for L band between the input port 101 and the second output port 103. As transmission spectra are schematically shown in FIG. 4, the transmissivity of the optical filter 120 was about −15 dB for C band and substantially 0 dB for L band.

Each of the amplification optical waveguides 211, 212, 311, and 312 was an optical silica-based fiber co-doped with Al element in addition to Er element, having an Er weight concentration of 500 wt. ppm (weight concentration in parts per million) and a cutoff wavelength of 1.1 $\mu$m. The length of the front-stage amplification optical waveguide 211 for C band was 5 m, and the length of the rear-stage amplification optical waveguide 212 was also 5 m. The length of the front-stage amplification optical waveguide 311 for L band was 15 m, whereas the length of the rear-stage amplification optical waveguide 311 for was 60 m.

The excitation light forwardly supplied to the front-stage amplification optical waveguide 211 for C band from the excitation light source 251 had a wavelength of 0.98 $\mu$m and a power of 75 mW. The excitation light forwardly supplied to the rear-stage amplification optical waveguide 212 for C band from the excitation light source 252 had a wavelength of 1.48 $\mu$m and a power of 15 mW. The excitation light forwardly supplied to the front-stage amplification optical waveguide 311 for L band from the excitation light source 351 had a wavelength of 0.98 $\mu$m and a power of 75 mW. The excitation light forwardly supplied to the rear-stage amplification optical waveguide 312 for L band from the excitation light source 352 had a wavelength of 1.48 $\mu$m and a power of 40 mW. The total gain of the optical amplifying apparatus 1 was 14 dB. Also, for each of C band and L band, a multiplexed optical signal inputted to the input end 11 of the optical amplifying apparatus 1 was −15.5 dBm/ch×8 ch.

Here, though the fluorescent spectrum peak wavelength of Er ion added to each of the amplification optical waveguides (Er-doped optical fibers) 211, 212, 311, and 312 was about 1530 nm, the population inversion was suppressed to a low level in each of the amplification optical waveguides 311 and 312 for the L-band optical amplifier 300, so as to shift their gain-occurring wavelength region to L band.

Figure 5:
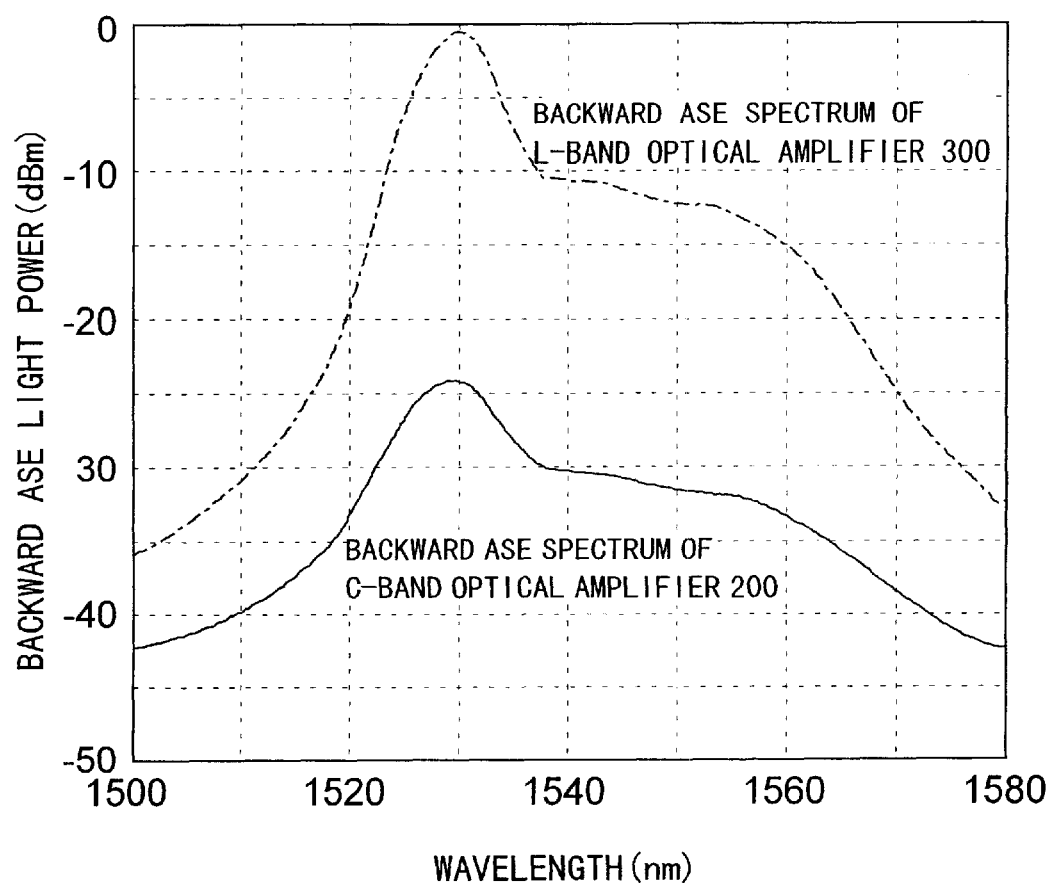
FIG. 5 a graph showing respective backward ASE light spectra of the C-band optical amplifier and L-band optical amplifier in the optical amplifying repeater station of FIG. 2.

FIG. 5 is a graph showing respective backward ASE spectra of the C-band optical amplifier 200 and L-band optical amplifier 300 in this example. The resolution of wavelength in this graph is 0.5 nm. The backward ASE spectrum of the C-band optical amplifier 200 was measured at the input end of the C-band optical amplifier 200 (point C1 in FIG. 2), whereas the backward ASE spectrum of the L-band optical amplifier 300 was measured at the input end of the L-band optical amplifier 300 (point L1 in FIG. 2). As can be seen from this graph, the backward ASE light of the L-band optical amplifier 300 has a peak at 1530 nm which is the fluorescent spectrum peak wavelength of Er ion, with its peak value reaching as high as −1 dBm.

It is presumed that, if no optical filter 120 is provided, these kinds of backward ASE light will be inputted as return light into the optical amplifying apparatus 1 from the input end 11 due to Rayleigh scattering in the optical fiber line connected to the front side thereof and then will be inputted to the C-band optical amplifier 200 by way of the optical branching section 110, whereby the noise characteristics will deteriorate. If the optical fiber line connected to the front side of the input end 11 is a standard single-mode optical fiber, the ratio of return light caused by Rayleigh scattering will be about 35 dB. While the insertion loss of the optical branching section 110 explained above with reference to FIG. 3 is additionally taken into consideration, respective powers of backward ASE light (at wavelengths of 1530 nm and 1575 nm) generated from the L-band and C-band optical amplifiers at individual points within the optical amplifying apparatus 1 in the case without the optical filter 120 are listed in Tables 1 and 2.

rioration of noise characteristics is about 0.177 dB in the L-band optical amplifier 300 even if there exists Rayleigh scattering of backward ASE light, whereby the effect of improving the noise characteristics is obtained due to the fact that no optical isolator (having an insertion loss of 0.5 dB) is provided in front of the front-stage amplification optical waveguide 311. In the C-band optical amplifier 200, on the other hand, though the apparent amount of deterioration of noise characteristics at the time when the Rayleigh scattering component of the backward ASE light emitted therefrom is re-inputted is about 0.166 dB, the apparent amount of deterioration of noise characteristics at the time when the Rayleigh scattering component of the backward ASE light generated from the L-band optical amplifier 300 is inputted is 3.3 dB or higher. It is because of the fact that the backward ASE light generated from the L-band optical amplifier 300 enters the C-band optical amplifier 200 due to the imperfect interband isolation in the optical branching section 110, thereby being amplified.

Therefore, in the optical amplifying apparatus 1 in accordance with this embodiment, the optical filter 120 is disposed as shown in FIG. 2, so as to restrain the deterioration

TABLE 1

Backward ASE Light Power Generated from L-Band Optical Amplifier without Optical Filter

| wavelength (nm) | Output ASE (dBm) at point L1 | Input ASE (dBm) at point A | Reinput ASE (dBm) at point C1 | Output ASE (dBm) at point C2 | Reinput ASE (dBm) at point L1 | Output ASE (dBm) at point L2 | Original ASE (dBm) | Apparent amount of deterioration of noise characteristics (dB) |
|---|---|---|---|---|---|---|---|---|
| 1530 | −1 | −11 | −46.7 | −29.1 | — | — | −29.7 | 3.321 |
| 1575 | −25 | −25.4 | — | — | −60.8 | −43.8 | −30.0 | 0.177 |

TABLE 2

Backward ASE Light Power Generated from C-Band Optical Amplifier without Optical Filter

| wavelength (nm) | Output ASE (dBm) at point C1 | Input ASE (dBm) at point A | Reinput ASE (dBm) at point C1 | Output ASE (dBm) at point C2 | Reinput ASE (dBm) at point L1 | Output ASE (dBm) at point L2 | Original ASE (dBm) | Apparent amount of deterioration of noise characteristics (dB) |
|---|---|---|---|---|---|---|---|---|
| 1530 | −25 | −25.7 | −61.4 | −43.8 | — | — | −29.7 | 0.166 |
| 1575 | −38 | −58 | — | — | −93.4 | −76.4 | −30.0 | 0.000 |

As shown in FIG. 2, point A is a point between the input end 11 and the input port 101 of the optical coupler 100, point C1 is the input end of the C-band optical amplifier 200, point C2 is the output end of the C band optical amplifier 200, point L1 is the input end of the L-band optical amplifier 300, and point L2 is the output end of the L-band optical amplifier 300.

Table 1 shows the output power at point L1, input power of return light at point A, input power at point C1, output power at point C2, input power at point L1, and output power at point L2 for the backward ASE light outputted from the L-band optical amplifier 300, as well as the original power of ASE light and the effective amount of deterioration of noise characteristics. Table 2 shows the output power at point C1, input power of return light at point A, input power at point C1, output power at point C2, input power at point L1, and output power at point L2 for the backward ASE light outputted from the C-band optical amplifier 200, as well as the original power of ASE light and the effective amount of deterioration of noise characteristics.

As can be seen from Tables 1 and 2, in the case where no optical filter 120 is provided, the apparent amount of deteof noise characteristics of the C-band optical amplifier 200. Namely, the backward ASE light generated from the L-band optical amplifier 300 is blocked by the optical filter 120, so that the Rayleigh scattering component of this backward ASE light is prevented from entering the C-band optical amplifier 200, whereby the deterioration of noise characteristics of the C-band optical amplifier 200 is restrained.

Also, since the backward ASE light generated from the L-band optical amplifier 300 should also be kept from being reflected by the optical filter 140 and thereby entering the L-band optical amplifier 300, it is preferred that, when the optical filter 120 is constituted by a grating, the latter be formed obliquely.

Since it is also important that the insertion loss of the optical filter 120 in L-band be minimized for suppressing the deterioration of noise characteristics in the L-band optical amplifier 300, the optical filter 120 is preferably a fiber grating. It will also be preferable if the fiber grating is formed in an optical fiber of the same kind as the optical fiber connecting the optical branching section 110 and the WDM coupler 321, since it will yield substantially no fusion loss.

When such an optical amplifying apparatus 1 is employed for constructing an optical transmission system such as one shown in FIG. 1, the optical amplifying apparatus 1 (amplifying repeater station), i.e., each of the optical amplifying apparatus $1_1$ to $1_N$, can secure an optical SN ratio of about 37.8 dB (at a wavelength resolution of 0.1 nm) at point B (a point between the output end 12, and the optical combiner 400) in FIG. 2. Hence, while an optical transmission system transmitting 2.5 Gb/s of signals per wave necessitates an optical SN ratio of about 20 dB when a margin is allowed in view of waveform distortions and the like, the number of stages N capable of amplification and relay can be increased to about 60 when this optical amplifying apparatus 1 is used. This number is about twice as much as the number of stages capable of amplification and relay in the case where the optical filter 120 is not provided. If an optical isolator is disposed in front of each of the amplification optical waveguide 211 in the C-band optical amplifier 200 and the amplification optical waveguide 311 in the L-band optical amplifier 300, the number of stages capable of amplification and relay will decrease to about 90% of that in this embodiment. Therefore, it is preferred that no optical isolator be disposed at such a position.

Figure 6:
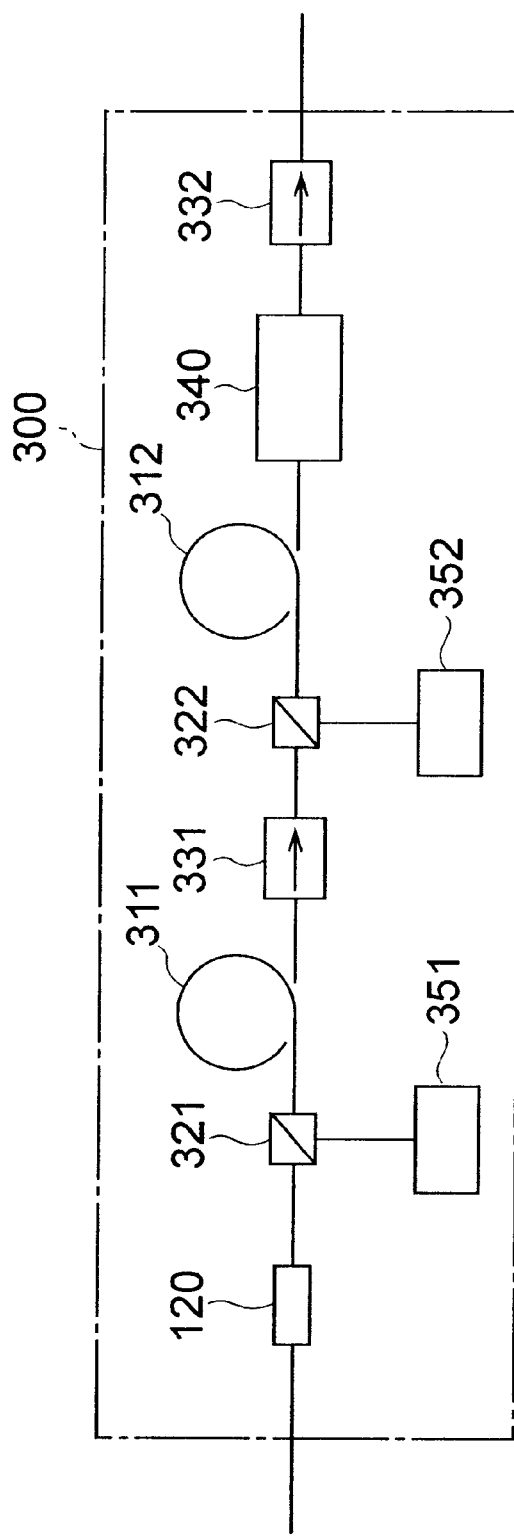
FIG. 6 is a schematic configurational view of an optical amplifier unit in the optical amplifying repeater station of FIG. 2.

Though the optical filter 120 is supposed to be an element of the optical coupler 100 in the optical amplifying apparatus 1 in accordance with this embodiment shown in FIG. 2, it should not be restricted thereto. It will be sufficient if the optical filter 120 is disposed on the optical path of L-band multiplexed optical signal between the optical branching section 110 and the amplification optical waveguide 311 in the L-band optical amplifier 300. The optical filter 120 may be either an independent element which does not belong to any of the optical coupler 100 and the L-band optical amplifier 300 or an element of the L-band optical amplifier 300. In the latter case, the optical filter 120 is disposed between the input end of the L-band optical amplifier 300 and the front-stage amplification optical waveguide 311 thereof as shown in FIG. 6. The backward ASE light generated in the amplification optical waveguide 311 is blocked by the optical filter 120, so as to be prevented from being outputted from the input end of the L-band optical amplifier 300 to the outside.

Without being restricted to the above-mentioned embodiment, the present invention can be modified in various manners. For example, each of the amplification optical waveguides 211, 212, 311, and 312 may not be an optical fiber but a planar optical waveguide. Also, each of the amplification optical waveguides 211, 212, 311, and 312 may not be doped with Er element but other fluorescent materials (e.g., rare earth elements such as Tm element).

When an amplification optical waveguide is doped with Tm element, optical amplification can be carried out in a wide band extending over both of 1.47-μm band and 1.50-μm band. Namely, though the fluorescent spectrum peak wavelength of Tm element is about 1.47 μm, the wavelength region where a gain occurs can be shifted to the wavelength band of 1.50 μm when the population inversion is kept low. Hence, a multiplexed optical signal is separated by the optical branching section into multiplexed optical signal in the wavelength band of 1.47 μm and multiplexed optical signal in the wavelength band of 1.50 μm, the multiplexed optical signal in the wavelength band of 1.47 μm is optically amplified by an optical amplifier for the wavelength band of 1.47 μm, and the multiplexed optical signal in the wavelength band of 1.50 μm is optically amplified by an optical amplifier for the wavelength band of 1.50 μm, whereby optical amplification can be carried out in a wide band extending over both of these wavelength bands of 1.47 μm and 1.50 μm.

The backward ASE light having a peak in the vicinity of the wavelength of 1.47 μm occurs in the optical amplifier for the wavelength band of 1.50 μm as well. If this ASE light is inputted to the optical amplifier for the wavelength band of 1.47 μm, then the noise characteristics in the optical amplifier for the wavelength band of 1.47 μm will deteriorate. Therefore, as in the above-mentioned embodiment, an optical filter is disposed on the optical path of the multiplexed optical signal in the 1.50-μm wavelength band between the optical branching section and the amplification optical waveguide of the optical amplifier for the 1.50-μm wavelength band in this case as well. Then, the light in the 1.50-μm wavelength band is transmitted through the optical filter, whereas the light in the 1.47-μm wavelength band is blocked thereby, so that the ASE light generated in the optical amplifier for the light in the 1.50-μm wavelength band is prevented from entering the optical amplifier for the light in the 1.47-μm wavelength band, whereby the deterioration of noise characteristics in the optical amplifier for the light in the 1.47-μm wavelength band can be restrained.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical transmission system for transmitting a multiplexed optical signal belonging to two wavelength bands to first and second transmission lines which are connected to each other by way of an amplifying repeater station;

said amplifying repeater station comprising:

an optical branching section, connected to said first transmission line, for separating said multiplexed optical signal into first and second wavelength bands different from each other and outputting thus separated multiplexed optical signals individually, while transmitting therethrough return light from a branch thereof to said first transmission line;

two optical amplifiers, each having an amplification optical waveguide doped with a predetermined fluorescent material having a fluorescent spectrum peak in said first wavelength band, connected to two outputs of said optical branching section, respectively, for amplifying the each of the multiplexed optical signals;

an optical combiner, connected to respective outputs of said optical amplifiers, for combining the amplified multiplexed optical signals and outputting thus combined optical signal to said second transmission line; and an optical filter, connected between the optical amplifier for amplifying the multiplexed optical signal in said second wavelength band and said optical branching section, for blocking light in the vicinity of said fluorescent spectrum peak wavelength and transmitting therethrough light in said second wavelength band.

2. An optical transmission system according to claim 1, wherein said optical branching section, said optical filter, and said optical amplifier 1 for said second wavelength band are connected in series in this order.

3. An optical transmission system according to claim 1, wherein said optical filter is an optical fiber grating in which a grating is formed in a core region of an optical fiber.

4. An optical transmission system according to claim 1, wherein said fluorescent material added to each said amplification optical waveguide is Er element or Tm element.

5. An optical amplifying apparatus used in an optical transmission system for transmitting a multiplexed optical signal belonging to two wavelength bands;

said optical amplifying apparatus comprising:

an optical branching section for separating said multiplexed optical signal into first and second wavelength bands different from each other and outputting thus separated multiplexed optical signals individually;

two optical amplifiers, each having an amplification optical waveguide doped with a predetermined fluorescent material having a fluorescent spectrum peak in said first wavelength band, connected to two outputs of said optical branching section, respectively, for amplifying the each of the multiplexed optical signals;

an optical combiner, connected to respective outputs of said optical amplifiers, for combining the amplified multiplexed optical signals and outputting thus combined optical signal; and an optical filter, connected between the optical amplifier for amplifying the multiplexed optical signal in said second wavelength band and said optical branching section, for blocking light in the vicinity of said fluorescent spectrum peak wavelength and transmitting therethrough light in said second wavelength band.

6. An optical amplifying apparatus according to claim 5, wherein said optical branching section, said optical filter, and said optical amplifier for said second wavelength band are connected in series in this order.

7. An optical amplifying apparatus according to claim 5, wherein said optical filter is an optical fiber grating in which a grating is formed in a core region of an optical fiber.

8. An optical amplifying apparatus according to claim 5, wherein said fluorescent material added to each said amplification optical waveguide is Er element or Tm element.

9. An optical amplifying unit used in an optical transmission system for transmitting a multiplexed optical signal belonging to two wavelength bands;

said optical amplifier unit comprising:

an optical amplifier, having an amplification optical waveguide doped with a predetermined fluorescent material, for amplifying a multiplexed optical signal in a wavelength band different from a wavelength band including a fluorescent spectrum peak of said fluorescent material; and an optical filter, connected to an input end of said optical amplifier, for blocking light in the vicinity of said fluorescent spectrum peak wavelength of said fluorescent material and transmitting therethrough light in the wavelength band to be amplified by said optical amplifier.

10. An optical amplifying unit according to claim 9, wherein said optical filter is an optical fiber grating in which a grating is formed in a core region of an optical fiber.

11. An optical amplifying unit according to claim 9, wherein said fluorescent material added to said amplification optical waveguide is Er element or Tm element.

12. An optical coupler used in an optical transmission system for transmitting a multiplexed optical signal belonging to two wavelength bands;

said optical coupler comprising:

an optical branching section for separating said multiplexed optical signal into first and second wavelength bands different from each other and outputting thus separated multiplexed optical signals individually; and an optical filter, connected to an output end of said optical branching section for the optical signal in said second wavelength band, for guiding said optical signal to an optical amplifier having an optical amplification waveguide doped with a fluorescent material having a fluorescent spectrum peak in said first wavelength band, said optical filter blocking light in the vicinity of said fluorescent spectrum peak wavelength and transmitting therethrough light in said second wavelength band.

13. An optical coupler according to claim 12, wherein said optical filter is an optical fiber grating in which a grating is formed in a core region of an optical fiber.

* * * * *